350-3.64 SR

XR 3,660,818

/ X 5033 W

United States Patent

Amodei et al.

[15] 3,660,818

[45] May 2, 1972

[54] ELECTRO-OPTICAL MEMORY

[72] Inventors: Juan Jose Amodei, Langhorne, Pa.; Richard Williams, Princeton, N.J.

[73] Assignee: RCA Corporation

[22] Filed: May 4, 1970

[21] Appl. No.: 34,118

[52] U.S. Cl. ....340/173 LS, 340/173 LM, 340/173 PP, 340/173.2, 350/3.5, 355/3, 355/5

[51] Int. Cl. ....G11c 11/22, G11c 13/04

[58] Field of Search ....340/173 LS, 173.2, 173 PP, 340/173 LM; 350/160 P, 3.5; 355/2, 3

[56] References Cited

UNITED STATES PATENTS

| | | | |
|---|---|---|---|
| 3,347,614 | 10/1967 | Fuller | 340/174 |
| 3,491,343 | 1/1970 | Cook | 340/173 |
| 3,512,864 | 5/1970 | Haertling | 340/173 |
| 3,083,615 | 4/1963 | El Sum | 355/2 |
| 3,517,206 | 6/1970 | Oliver | 340/173 |

*Primary Examiner*—Terrell W. Fears
*Attorney*—H. Christoffersen

[57] ABSTRACT

Information is optically written onto the electrically charged surface of a transparent storage medium by directing light modulated with this information at this surface. The light partially discharges the charge and creates an electrical charge pattern which remains stored for long periods. The light either may be scanned across the surface to achieve sequential information storage or may be employed to write a large amount of information in parallel, for example in the form of a hologram. The stored information may be optically recovered by directing polarized light at the storage medium and employing a suitably oriented analyzer or, in the case of hologram storage, by wavefront reconstruction.

10 Claims, 9 Drawing Figures

3660818
OR IN 340/173LS

PATENTED MAY 2 1972 3,660,818

SHEET 1 OF 2

INVENTORS
Juan J. Amodei and
Richard Williams
BY [signature]
ATTORNEY

INVENTORS
Juan J. Amodei and
Richard Williams
BY [signature]
ATTORNEY

ELECTRO-OPTICAL MEMORY

BACKGROUND OF THE INVENTION

There is a need in the computer industry for a high resolution, large capacity, optical storage device which can be operated at reasonable speed and whose information content readily can be altered. The object of the present invention is to provide an improved solution to this problem.

SUMMARY OF THE INVENTION

The storage medium of the invention is a photosensitive material which initially is electrically charged at one surface thereof. Information is optically written onto the surface by directing modulated light at the surface and is optically read also by means of light. Writing and reading may be accomplished serially or in parallel.

DETAILED DESCRIPTION

A number of different materials may be employed as the storage medium in systems embodying the present invention. These include ferroelectric materials such as strontium titanate, barium titanate, barium sodium niobate and barium strontium niobate among others. In insulating materials such as these, which have been rendered conductive by the inclusion of dopants or vacancies, when the surface is electrically charged as, for example, by a high voltage corona discharge either in air or in a suitable gas, or by means of electrons, a depletion layer is formed immediately beneath the charged surface in which relatively intense electrical fields become stored.

Figure 1:
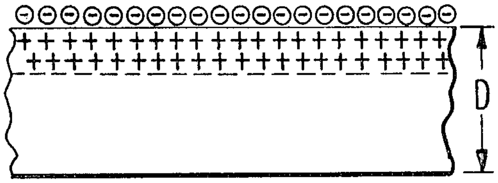
FIGS. 1 and 2 are schematic showings of one form of storage medium which may be employed in practicing the present invention.

FIG. 1 schematically illustrates this phenomenon. The surface charge, chosen to be negative for purposes of the present illustration but which may instead be positive, is shown as minus signs within the circles and the high electric field produced in the depletion layer is shown as plus signs. The high fields present in the depletion layer cause significant phase changes in polarized light passing through the layer.

Figure 2:
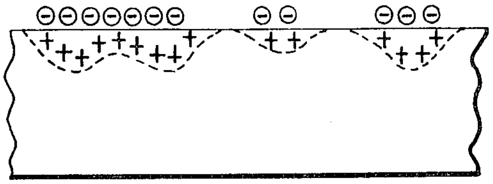

We have found that the above phenomenon may be employed as a basis for the storage of information—either binary or analog information. When modulated light of sufficient intensity is directed at the charged surface of the material, selective discharge occurs. FIG. 2 shows schematically the charge and corresponding electric field which remains after such selective discharge. The remaining charge pattern corresponds to the light modulation. As will be shown shortly, this pattern can be produced either by applying to the surface a spatially modulated beam such as a picture or a hologram interference pattern, or by scanning an intensity modulated beam across the surface. As will also be shown in more detail below, the stored information may be recovered by shining polarized light, at a relatively lower level of intensity, onto the surface and employing a suitably oriented analyzer, and screen or other light receiving means, or in the case of hologram storage, the information may be recovered by wavefront reconstruction.

Figure 3:
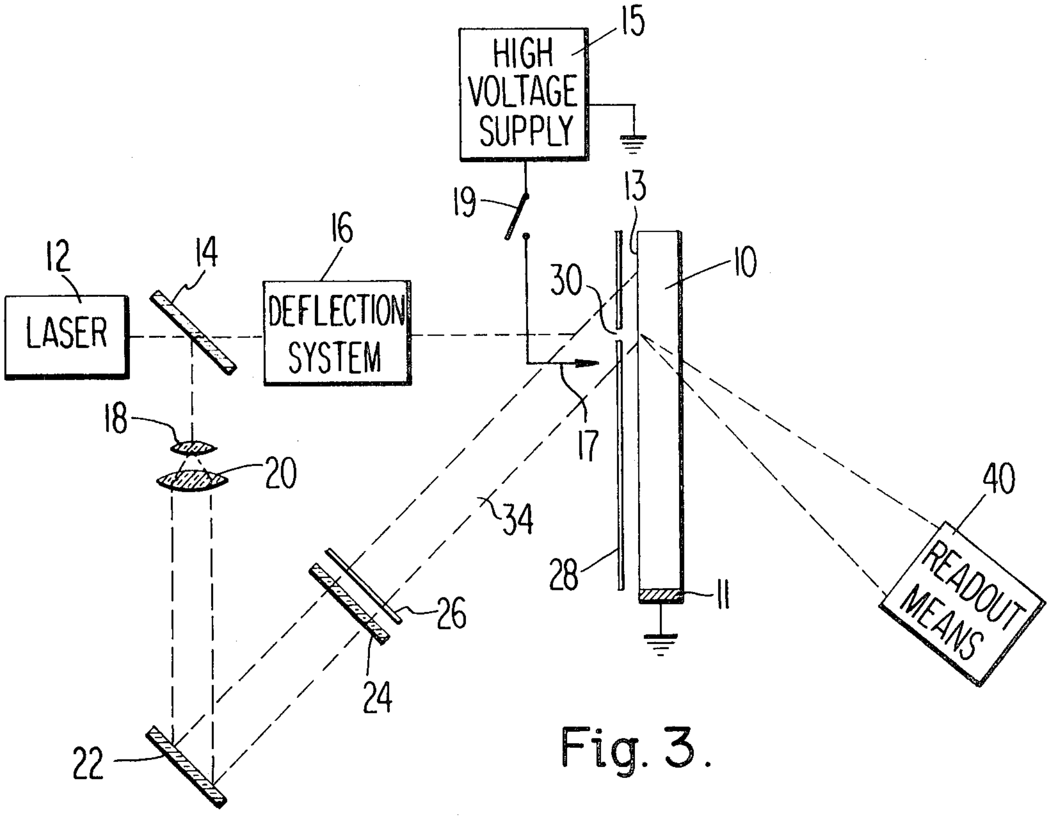
FIG. 3 is a block and schematic showing of a system embodying the invention for storing holograms.

FIG. 3 illustrates a system embodying the invention for storing and retrieving hologram information. The storage medium 10 is the electro-optical semiconducting medium discussed above. This medium is transparent to light. An electrode 11 may be secured to the medium and this electrode may be connected to ground.

The medium 10 may be prepared to store information by charging the surface 13 thereof. To accomplish this, the mask, which will be discussed shortly, is removed and the high voltage supply 15 is placed in the circuit, for example by closing switch 19. The source, which may apply a voltage of say seven thousand to ten thousand volts to electrode 17, causes a corona discharge to occur between the electrode and the surface and as a consequence a charge is distributed relatively uniformly over the surface 13 of the medium 10. It should be mentioned here that this is only one of several ways of creating such a charge. Other alternatives are discussed later in connection with other embodiments of the invention. After the charging, the mask 28 may be returned to its original position and the switch 19 opened and, if desired, the electrode 17 may be removed.

The "write" portion of the system of FIG. 3 includes a laser 12 which applies a portion of a coherent light beam through half-silvered mirror 14 to the deflection system 16. Another portion of the beam is reflected from the mirror and through an optical system, illustrated schematically by the two lenses 18 and 20, onto mirror 22. The mirror reflects the broadened beam of light through a diffuser 24 and object 26 onto the mask 28. The mask is formed with an aperture 30 therein and the reference beam 32 and a portion of the object or information beam 34 passes through this aperture.

Figure 4:
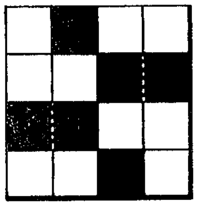
FIGS. 4 and 5 are schematic showings of portions of the system of FIG. 3.

The object 26 may consist of a "page" of binary information such as illustrated in FIG. 4. While in practice this page may contain $10^4$ to $10^6$ bits, for purposes of the present discussion only 16 such bits are shown. A bit of one value, such as binary one, is represented by a transparent square and the bit of other value, binary "O," by an opaque square (or vice versa).

The mask 28, when employed, is mechanically movable in two directions to permit any one of say $10^3$ to $10^6$ storage locations on the storage medium 10 to be accessed. Of course, each time it is desired to write in another memory location, a different page may be inserted at 26. The opening in the mask and the storage location defined thereby may be very small—of the order of several millimeters square or less.

When the laser 12 is turned on, the deflection system 16, which may be any one of a number of known electronic, acoustic, or electro-mechanical systems, deflects the laser beam through the opening 30 in the mask 28 and onto a storage location on the storage medium 10. A portion of the information beam also illuminates the same location on the storage medium 10. The result of the illumination of the surface of the medium 10 by the reference and information beams is the selective discharge of the electrical charge on the surface 13, to leave remaining on the surface a charge pattern which is stored as a hologram in the storage medium.

A number of different alternative forms of the system of FIG. 3 are possible. For example, with suitable optics to collimate the object beam 34, the mask 28 may be eliminated.

A hologram such as described above, may be read out by the portion 12, 16 of the system of FIG. 3 and a readout means such as 40. The remaining elements 14, 18, 20, 22, 24, 26 may be removed. The laser beam now at relatively low intensity, is deflected to a desired location on the storage medium. The readout means may be located at 40, that is, in a position conjugate to that of the page 26 during the writing of information. At this location, the reconstructed image results from transmission of light through the hologram. The image is reconstructed because the differently charged regions of the stored pattern introduce the required, different amounts of phase delay in the transmitted light in a manner quite analogous to what occurs, for example, in the readout of a recorded "phase hologram."

As an alternative to the above, the readout means may be at location 26. Here the reconstructed real image is formed by reflection of light from the hologram.

Figure 5:
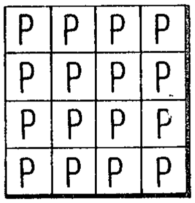

The readout means 40 may take one of a number of forms. For example, the readout means may be an array of photocells, each at a position corresponding to that of a bit of information on the page. In the example chosen for illustration, there are 16 such photocells, each identified by the character P, as shown in FIG. 5.

Figure 6:
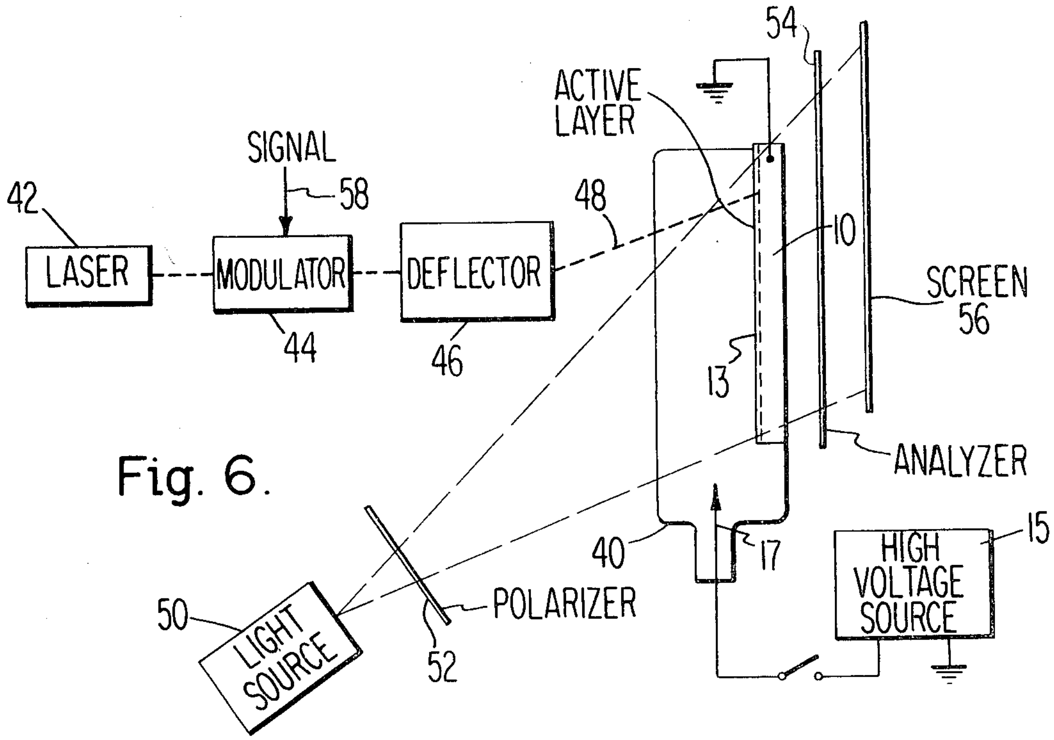
FIG. 6 is a block and schematic showing of another embodiment of the present invention.

A second embodiment of the invention is shown in FIG. 6. Here the "active surface" of the storage medium 10 may be in air as in FIG. 3, however, for purposes of the present example, is shown enclosed within a transparent glass envelope 40 containing a gas other than air. An example of a suitable gas is sulfur hexafluoride ($SF_6$). The preliminary charging of the storage medium 10 is by means of a voltage source 15 and electrode 17 just as in the system of FIG. 3. The advantage of this arrangement over the FIG. 3 arrangement is that the ability of an insulator to store charge from a corona discharge depends on the kind of ion formed in the discharge. Use of gases other than air extends the range of insulator materials which may be used.

The system of FIG. 6 includes a light source 42 shown as a laser but which is not necessarily a laser. The beam of light produced by the source passes through a modulator 44 and a beam deflector 46. The latter may be any suitable electrical acoustic, or electromechanical type deflector. The deflected beam of light 48 is caused by the deflector to raster scan the surface 13 of the storage medium 10 in, for example, television fashion.

The readout portion of the system of FIG. 6 includes a light source 50 which produces light at a lower level of intensity than the source 42. The beam of light produced by the source 50 passes through a polarizer 52 which converts the light to linearly polarized light. The linearly polarized light passes through the storage medium and through an analyzer 54 to any suitable image receiving means as, for example, screen 56. As alternatives to the screen, there simply may be a viewer present at 56 or, if desired, a storage medium as, for example, a film, or a light pickup device such as a television camera.

In operation, during the write cycle the light source 42 produces an intense beam of light which is scanned in raster fashion across the active surface 13 of the storage medium. The signal applied to lead 58 causes the modulator 44 to intensity modulate the light beam in accordance with the information content of the signal. Thus the raster scanned light beam at 48 traces some intelligence such as a picture, character or the like, or simply high density binary information, on the surface 14. It records this intelligence by selectively discharging the stored charge.

The charge pattern created, as described above, may be read out at a later time, in "parallel," by the light source 50. With the polarizer suitably oriented relative to the analyzer, the portions of the storage medium 10 retaining high electrical fields may be made to "extinguish" or partially extinguish the light and the portions of the polarizer storing lower values of electric field may be made to pass successively greater amounts of light, proportionally to the amount of discharge which has occurred during the write operation. Operation in complementary fashion is, of course, also possible in which case the image read out would correspond to a negative rather than a positive.

Operation in the way described above occurs because the differently charged regions of storage medium effectively rotate the plane of polarization of the linearly polarized light through different angles. The polarizer can be so oriented that the most intensely charged regions do not cause a change in the polarization angle. The least intensely charged regions, in this case, will delay one of the light components an amount different than the other to cause the linearly polarized light to become elliptically polarized. By proper choice of device parameters such as, for example, the value of voltage employed to lay down the initial charge, the least charged areas can be made to produce light impinging on the analyzer which has a substantial component oriented at 90° to the plane of polarization of the light passing through the most intensely charged regions. The analyzer may be oriented substantially completely to extinguish the plane polarized light passing through the most intensely charged regions and at least a large portion of the light passing through the least intensely charged regions, or may be rotated through an angle of 90° relative to this orientation.

While the system of FIG. 6 illustrates sequential write and parallel read, other forms of the invention also are possible. For example, if the embodiment of FIG. 6 is used for the storage of binary information, sequential read may be employed to read out a bit at a time or, if desired, a byte consisting of some standard number such as eight bits at a time. A sequential read arrangement would include components analogous to 42, 44, 46 of FIG. 6 for readout. However, the light source preferably operates at an intensity which is sufficiently low to permit non-destructive readout.

In the systems both of FIGS. 3 and 6 the stored information may be erased by any one of a number of methods. For example, the surface may be recharged again by the high voltage source. As a second example, an intense beam of light which is unmodulated may be employed completely to discharge the surface 13.

Figure 7:
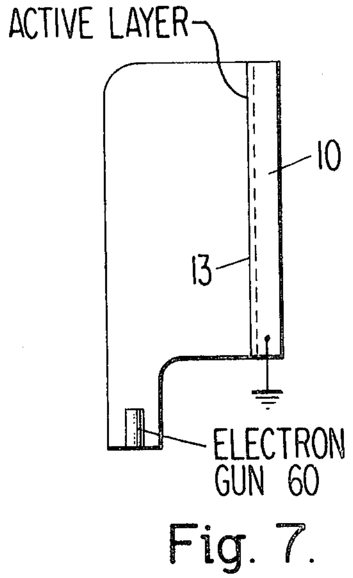
FIG. 7 is a schematic showing of an alternative for a portion of the system of FIG. 3 or FIG. 6.

In both the embodiments of FIGS. 3 and 6 electron beam charging rather than corona charging may be employed. A suitable way of achieving electron beam charging is to make the storage medium 10 the faceplate of a cathode ray tube as shown in FIG. 7. This storage medium may be grounded and the electron gun 60 operated at a high negative potential to provide a flood beam of electrons which travel to the surface 13 of the storage medium. As an alternative, suitable beam deflection means may be employed to raster scan the surface 13 and in this way to deposit a uniform charge on the surface.

The storage medium 10 shown in FIGS. 1 and 2 may have a thickness $D$=1 mm (although this is not critical) and may have a depletion region which is only a very small fraction of this thickness. The effective thickness of this region is determined by the doping level of the material. The larger the resistivity produced by doping, the greater the effective thickness of the layer. For example, in strontium titanate with a doping concentration of $10^{18}$ donors/cm.$^3$ the depletion layer effective thickness is roughly $2 \times 10^{-4}$ centimeters for depletion layer voltages of about 100 volts.

Figure 8:
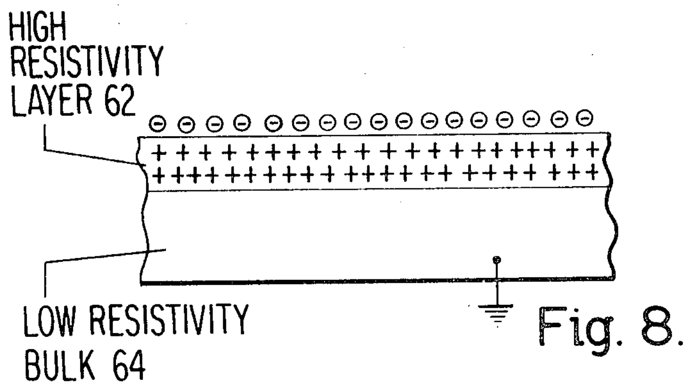
FIGS. 8 and 9 are schematic showings of other forms of storage media which may be employed in practicing the present invention.

A number of geometries other than those shown in FIGS. 1 and 2 may be employed in the arrangements of FIGS. 3 and 6. One example is shown in FIG. 8 and consists of a high resistivity layer 62 on a low resistivity substrate 64. This geometry may be achieved by starting out with a crystal of a large band gap semiconductor such as gallium phosphide, gallium arsenide or the like, which has been doped with donor impurities such as selenium, tellurium, sulfur, silicon or tin throughout its volume, followed by the diffusion of compensator acceptor impurities such as zinc, cadmium, manganese or magnesium in a narrow layer of the surface. The compensating centers neutralize the effect of the donor impurities by trapping the free electrons contributed by the donor atoms and thus returning the material to intrinsic values of resistivity.

In many ionic crystals of the type suitable for use in the FIGS. 1 and 6 systems, which crystals exhibit high electro-optical coefficients, a preferred technique for increasing the conductivity of the intrinsic samples is to create vacancies in the lattice by means of a reduction process. This can be done in $SrTiO_3$ or $BaTiO_3$ by heating the material to a temperature of about 700° C. in a hydrogen atmosphere for a few hours. This treatment gives rise to oxygen vacancies in the lattice which act as donors. The material may be used without further treatment as in FIG. 1, however, preferably a high resistivity surface layer such as 62 of FIG. 8 is then produced by subsequent oxidation of the crystal by heating the crystal to about 900° C. for a predetermined period of time in an oxygen atmosphere. This eliminates the vacancies in a layer whose thickness can be controlled by controlling the oxidation time.

Figure 9:
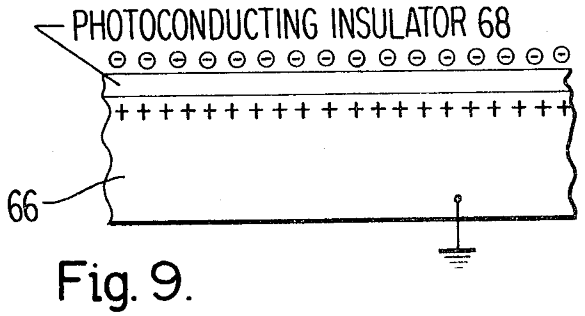

Another form of storage medium suitable for practicing the present invention is shown in FIG. 9. It consists of a transparent bulk conductor or semiconductor 66 with a thin surface layer of a photoconducting insulator such as strontium titanate ($SrTiO_3$) or barium titanate ($BaTiO_3$). The thin film may be deposited on the bulk 66 by vacuum deposition or sputtering or may be epitaxially grown on the bulk 66. A typical thickness for the photoconducting layer is one micron and typical lateral dimensions may be 2 × 2 cm. In the operation of this form of storage medium, the photoconductor layer 68 constitutes the active layer of the device since the field generated by the charge pattern appears across the entire thickness of this film. In other respects, the operation is similar to that already described. First, the surface is charged as already discussed and then writing is accomplished by exposing the surface to light of a wavelength that creates electron—hole pairs in the layer 68 or which frees the charges from the ions on the surface.

During the initial charging of the storage medium of FIGS. 8 and 9, the bulk (64 or 66) may be grounded, as shown.

Two methods of charging the surface of the storage medium have already been discussed. A third method is also possible. It consists of wiping the surface with an ionic solution consisting of an ionizing salt such as sodium chloride dissolved in a volatile organic solvent such as acetone. A blotter or similar absorbent applicator may be used to apply a thin layer of the solution to the insulator surface. The electrical voltage applied between the solution and insulator causes ions of one sign to be preferentially transferred to the solid surface, leaving it electrically charged. The excess volatile solvent remaining on the insulator surface after it has been charged, quickly evaporates, leaving behind only the ions and their associated charge.

The storage techniques discussed above can provide semi-permanent or permanent storage of information. Without any special precautions, days or weeks of storage time may be achieved and this is sufficient for any dynamic storage application and for many read-write memory applications. Ferroelectric materials also may be employed to provide permanent storage. Here, however the ferroelectric crystal surface should be heated to a temperature just above the Curie temperature during the write cycle and thereafter may be cooled down to a substantially lower temperature. In this way the domain pattern induced by the charge remains permanently locked in.

The storage systems of the present invention have a number of important advantages. For example, theory indicates that phase shifts in the light passing through the medium as large as 180° are possible. With this amount of phase shift, hologram efficiencies of 30 percent are achievable as well as complete extinction of light traversing regions of high charge with nearly 100 percent transmission in discharged regions in non-holographic applications (illustrated in FIG. 6). Theoretical studies also indicate that the writing sensitivity obtainable is about 1 microjoule per contimeter$^2$ which is orders of magnitude higher then for other techniques. This high sensitivity permits sequential writing at high frame rates and at high information packing density.

What is claimed is:

1. A storage system comprising, in combination:
   a transparent, light responsive element of the type which is capable of storing an electrical charge on its surface;
   means for applying an electrical charge to said surface;
   means for writing on said surface comprising means for applying modulated light at relatively high intensity to said surface for selectively discharging said charge; and
   means for reading from said surface comprising means for applying light at relatively low intensity to said surface and means receptive of said light from said element and responsive to a parameter thereof.

2. A storage system as set forth in claim 1 wherein said element is formed of a ferroelectric material.

3. A storage system as set forth in claim 1 wherein said element comprises a high resistivity surface region on a low resistivity substrate.

4. A storage system as set forth in claim 1 wherein said element comprises a photoconductive film on a high conductivity substrate.

5. A storage system as set forth in claim 1 wherein said means for reading includes a source of linearly polarized light and an analyzer oriented to distinguish those portions of the polarized light passing through differently charged regions of said surface.

6. A storage system as set forth in claim 1 wherein said means for writing comprises means for applying to said surface an interference pattern representing a hologram.

7. A storage system as set forth in claim 6 wherein said means for reading comprises means for applying coherent light to said surface for reconstructing the image stored as an electrical charge hologram, and means at the position of said image for receiving the same.

8. A storage system as set forth in claim 1 wherein said means for charging comprises a high voltage source for creating a corona discharge to said surface.

9. A storage system as set forth in claim 1 wherein said means for charging comprises a source of electrons and means for directing said electrons at said surface.

10. A storage system as set forth in claim 2 wherein said means for writing on said surface includes means for heating said ferroelectric material to a temperature just above its Curie temperature and for then permitting said ferroelectric material to cool to a temperature lower than the Curie temperature.

* * * * *